(12) United States Patent
Yi et al.

(10) Patent No.: US 11,966,299 B2
(45) Date of Patent: Apr. 23, 2024

(54) USER TERMINAL, DEBUGGING DEVICE, AND DATA BACKUP METHOD

(71) Applicant: HUAWEI TECHNOLOGIES CO., LTD., Shenzhen (CN)

(72) Inventors: Hongbin Yi, Dongguan (CN); Jinfeng Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 374 days.

(21) Appl. No.: 17/503,944

(22) Filed: Oct. 18, 2021

(65) Prior Publication Data

US 2022/0035712 A1 Feb. 3, 2022

Related U.S. Application Data

(63) Continuation of application No. PCT/CN2020/084641, filed on Apr. 14, 2020.

(30) Foreign Application Priority Data

Apr. 18, 2019 (CN) .......................... 201910314417.8

(51) Int. Cl.
*G06F 11/14* (2006.01)
*G06F 21/31* (2013.01)

(52) U.S. Cl.
CPC .......... *G06F 11/1448* (2013.01); *G06F 21/31* (2013.01)

(58) Field of Classification Search
CPC .............................. G06F 11/1448; G06F 21/31
See application file for complete search history.

(56) References Cited

U.S. PATENT DOCUMENTS

| 2002/0138705 | A1 | 9/2002 | Suzuki et al. |
| 2004/0044864 | A1 | 3/2004 | Cavallo |
| 2004/0128456 | A1 | 7/2004 | Kobayashi et al. |
| 2010/0005202 | A1 | 1/2010 | Ferraiolo et al. |

(Continued)

FOREIGN PATENT DOCUMENTS

| CN | 101178636 A | 5/2008 |
| CN | 101674331 A | 3/2010 |

(Continued)

OTHER PUBLICATIONS

Chinese Office Action issued in corresponding Chinese Application No. 201910314417.8, dated Jan. 13, 2022, pp. 1-7.

(Continued)

*Primary Examiner* — Elton Williams
(74) *Attorney, Agent, or Firm* — HAUPTMAN HAM, LLP

(57) ABSTRACT

A user terminal, a debugging device, and a data backup method are provided. The user terminal includes a storage component, an I/O controller, a main controller, a first CC controller, a first MUX, a second MUX, a third MUX, and a first interface. The first CC controller is connected to each of the first interface and a first signal selection input end of the first MUX; a first signal input end of the first MUX is connected to the I/O controller, a second signal input end of the first MUX is connected to the main controller, and a first signal output end of the first MUX is connected to the first interface; the main controller is connected to each of a second signal selection input end of the second MUX and a third signal selection input end of the third MUX.

15 Claims, 5 Drawing Sheets

(56) References Cited

U.S. PATENT DOCUMENTS

| 2016/0187420 A1* | 6/2016 | Trethewey ....... G01R 31/31705 |
| | | 714/727 |
| 2016/0306763 A1 | 10/2016 | Geva et al. |
| 2017/0017595 A1 | 1/2017 | Schnell |
| 2018/0364935 A1 | 12/2018 | Sundrani |

FOREIGN PATENT DOCUMENTS

| CN | 105068892 A | 11/2015 |
| CN | 107562500 A | 1/2018 |
| CN | 108664325 A | 10/2018 |
| WO | 2018133242 A1 | 7/2018 |

OTHER PUBLICATIONS

European Search Report issued in corresponding European Application No. 20790944.1, dated Apr. 4, 2022, pp. 1 1-9.
Universal Serial Bus Power Delivery Specification, Revision: 3.0, Version: 1.1,Jan. 12, 2017, 579 pages.
Universal Serial Bus Type-C Cable and Connector Specification, Release 1.3, Jul. 14, 2017, 241 pages.
International Search Report issued in corresponding International Application No. PCT/CN2020/084641, dated Jul. 15, 2020, pp. 1-10.

* cited by examiner

USER TERMINAL, DEBUGGING DEVICE, AND DATA BACKUP METHOD

CROSS-REFERENCE TO RELATED APPLICATIONS

This application is a continuation of International Application No. PCT/CN2020/084641, filed on Apr. 14, 2020, which claims priority to Chinese Patent Application No. 201910314417.8, filed on Apr. 18, 2019. The disclosures of the aforementioned applications are hereby incorporated by reference in their entireties.

BACKGROUND

Currently, a storage component (for example, a hard disk) of a user terminal is usually mounted on an input/output (I/O) controller in a system on chip (SoC). When a user needs to back up data in the storage device, the user connects a data backup device to the I/O controller through an interface (for example, a universal serial bus type-C (USB Type-C) interface) of the user terminal. In this way, the backup device reads the data in the storage device by using the I/O controller, to back up the data in the storage device to the backup device.

However, when the I/O controller of the user terminal is faulty, the user is not able to back up the data in the storage device.

SUMMARY

Embodiments of this application provide a user terminal, a debugging device, and a data backup method, so that data in a storage device is backed up when an I/O controller of the user terminal is faulty. The technical solutions are as follows:

According to a first aspect, a user terminal is provided, and the user terminal includes a storage component, an I/O controller, a main controller, a first CC controller, a first MUX, a second MUX, a third MUX, and a first interface.

The first CC controller is connected to each of the first interface and a first signal selection input end of the first MUX, and is configured to send a first signal switching instruction to the first MUX when detecting that a debugging device is connected to the first interface of the user terminal.

A first signal input end of the first MUX is connected to the I/O controller, a second signal input end of the first MUX is connected to the main controller, and a first signal output end of the first MUX is connected to the first interface; and the first MUX is configured to connect the second signal input end to the first signal output end when receiving the first signal switching instruction, so that the main controller receives, through the first interface, a data backup instruction sent by the debugging device.

The main controller is connected to each of a second signal selection input end of the second MUX and a third signal selection input end of the third MUX, and is configured to: when receiving the data backup instruction, send a second signal switching instruction to the second MUX, and send a third signal switching instruction to the third MUX.

A third signal input end of the second MUX is connected to the I/O controller, a fourth signal input end of the second MUX is connected to a sixth signal input end of the third MUX, and a second signal output end of the second MUX is connected to the storage component; and the second MUX is configured to connect the fourth signal input end to the second signal output end when receiving the second signal switching instruction.

A fifth signal input end of the third MUX is connected to the I/O controller, and a third signal output end of the third MUX is connected to the first interface; and the third MUX is configured to connect the sixth signal input end to the third signal output end when receiving the third signal switching instruction.

The storage component is configured to: when the fourth signal input end of the second MUX is connected to the second signal output end of the second MUX, and the sixth signal input end of the third MUX is connected to the third signal output end of the third MUX, receive an I/O instruction sent by the debugging device, and perform data backup processing according to the I/O instruction.

In a possible implementation, when the storage component is a storage component of a bus and interface PCIe type, the user terminal further includes a clock selector and a fourth MUX.

The main controller is connected to each of a fourth signal selection input end of the clock selector and a fifth signal selection input end of the fourth MUX, and is configured to: when receiving the data backup instruction, send a fourth signal switching instruction to the clock selector, and send a fifth signal switching instruction to the fourth MUX.

A seventh signal input end of the clock selector is connected to the I/O controller, an eighth signal input end of the clock selector is connected to a tenth signal input end of the fourth MUX, and a fourth signal output end of the clock selector is connected to the storage component; and the clock selector is configured to connect the eighth signal input end to the fourth signal output end when receiving the fourth signal switching instruction.

A ninth signal input end of the fourth MUX is connected to the I/O controller, and a fifth signal output end of the fourth MUX is connected to the first interface; and the fourth MUX is configured to connect the tenth signal input end to the fifth signal output end when receiving the fifth signal switching instruction.

The storage component is further configured to: when the eighth signal input end of the clock selector is connected to the fourth signal output end of the clock selector, and the tenth signal input end of the fourth MUX is connected to the fifth signal output end of the fourth MUX, receive a clock signal sent by the debugging device, to implement clock synchronization between the storage component and the debugging device.

In a possible implementation, the user terminal further includes an authentication information input component connected to the main controller.

The main controller is further configured to: when receiving the data backup instruction, send an authentication request instruction to the authentication information input component.

The authentication information input component is configured to: when receiving the authentication request instruction, collect authentication information of a user, and send an authentication response instruction to the main controller, where the authentication response instruction carries the authentication information.

The main controller is further configured to: when receiving the authentication response instruction, perform authentication on the user based on the authentication information and prestored user information, and if the authentication succeeds, send the second signal switching instruction to the second MUX, and send the third signal switching instruction to the third MUX.

According to a second aspect, a debugging device is provided, and the debugging device includes an interface controller, a connection component, and a second interface.

The connection component is connected to the second interface, and is configured to: after the second interface is connected to a first interface of a user terminal, enable the user terminal to detect that the debugging device is connected to the user terminal.

The interface controller is connected to the second interface, and is configured to send a data backup instruction to a main controller of the user terminal when detecting a data backup request instruction of a user.

The interface controller is further configured to send an I/O instruction to a storage component of the user terminal to perform data backup processing.

In a possible implementation, the connection component includes a second CC controller.

The second CC controller is connected to the second interface, and is configured to: after the second interface is connected to the first interface of the user terminal, send a connection instruction to a first CC controller of the user terminal through the second interface, so that after receiving the connection instruction, the first CC controller determines that the debugging device is connected to the user terminal.

In a possible implementation, the connection component includes a resistor module.

The resistor module is connected to the second interface, and is configured to: after the debugging device is connected to the first interface of the user terminal through the second interface, enable a first CC controller of the user terminal to switch from a high potential to a low potential, to determine that the debugging device is connected to the user terminal.

According to a third aspect, a user terminal is provided, and the user terminal includes a storage component, an I/O controller, a main controller, an interface controller, a first MUX, a second MUX, and a first interface.

The main controller is connected to each of a first signal selection input end of the first MUX and a second signal selection input end of the second MUX, and is configured to: when receiving a data backup request instruction of a user, send a first signal switching instruction to the first MUX, and send a second signal switching instruction to the second MUX.

A first signal input end of the first MUX is connected to the I/O controller, a second signal input end of the first MUX is connected to the interface controller, and a first signal output end of the first MUX is connected to the storage component; and the first MUX is configured to connect the second signal input end to the first signal output end when receiving the first signal switching instruction.

A third signal input end of the second MUX is connected to the I/O controller, a fourth signal input end of the second MUX is connected to the interface controller, and a second signal output end of the second MUX is connected to the first interface; and the second MUX is configured to connect the fourth signal input end to the second signal output end when receiving the second signal switching instruction.

The interface controller is configured to: when the second signal input end of the first MUX is connected to the first signal output end of the first MUX, and the fourth signal input end of the second MUX is connected to the second signal output end of the second MUX, send an I/O instruction to the storage component to perform data backup processing.

In a possible implementation, when the storage component is a storage component of a bus and interface PCIe type, the user terminal further includes a clock selector.

The main controller is connected to a third signal selection input end of the clock selector, and is configured to send a third signal switching instruction to the clock selector when receiving a data backup instruction.

A fifth signal input end of the clock selector is connected to the I/O controller, a sixth signal input end of the clock selector is connected to the interface controller, and a third signal output end of the clock selector is connected to the storage component; and the clock selector is configured to connect the sixth signal input end to the third signal output end when receiving the third signal switching instruction.

The storage component is further configured to: when the sixth signal input end of the clock selector is connected to the third signal output end of the clock selector, receive a clock signal sent by the interface controller, to implement clock synchronization between the storage component and the interface controller.

In a possible implementation, the user terminal further includes an authentication information input component connected to the main controller.

The main controller is further configured to: when receiving the data backup instruction, send an authentication request instruction to the authentication information input component.

The authentication information input component is configured to: when receiving the authentication request instruction, collect authentication information of a user, and send an authentication response instruction to the main controller, where the authentication response instruction carries the authentication information.

The main controller is further configured to: when receiving the authentication response instruction, perform authentication on the user based on the authentication information and prestored user information, and if the authentication succeeds, send the first signal switching instruction to the first MUX, and send the second signal switching instruction to the second MUX.

According to a fourth aspect, a data backup method is provided. The method is applied to the user terminal according to the first aspect, and the method includes:

A first CC controller sends a first signal switching instruction to a first MUX when detecting that a debugging device is connected to a first interface of the user terminal.

The first MUX receives the first signal switching instruction, and connects a second signal input end to a first signal output end according to the first signal switching instruction, so that a main controller receives, through the first interface, a data backup instruction sent by the debugging device.

When receiving the data backup instruction, the main controller sends a second signal switching instruction to a second MUX, and sends a third signal switching instruction to a third MUX.

The second MUX receives the second signal switching instruction, and connects a fourth signal input end to the second signal output end according to the second signal switching instruction.

The third MUX receives the third signal switching instruction, and connects the sixth signal input end to the third signal output end according to the third signal switching instruction.

The storage component receives an I/O instruction sent by the debugging device, and performs data backup processing according to the I/O instruction.

In a possible implementation, when the storage component is a storage component of a bus and interface PCIe type, the user terminal further includes a clock selector and a fourth MUX; and the method further includes:

When receiving the data backup instruction, the main controller sends a fourth signal switching instruction to the clock selector, and sends a fifth signal switching instruction to the fourth MUX.

The clock selector receives the fourth signal switching instruction, and connects the eighth signal input end to the fourth signal output end according to the fourth signal switching instruction.

The fourth MUX receives the fifth signal switching instruction, and connects the tenth signal input end to the fifth signal output end according to the fifth signal switching instruction.

The storage component receives a clock signal sent by the debugging device, to implement clock synchronization between the storage component and the debugging device.

In a possible implementation, the user terminal further includes an authentication information input component connected to the main controller; and the method further includes:

When receiving the data backup instruction, the main controller sends an authentication request instruction to the authentication information input component.

When receiving the authentication request instruction, the authentication information input component collects authentication information of a user, and sends an authentication response instruction to the main controller, where the authentication response instruction carries the authentication information.

When receiving the authentication response instruction, the main controller performs authentication on the user based on the authentication information and prestored user information, and if the authentication succeeds, sends the second signal switching instruction to the second MUX, and sends the third signal switching instruction to the third MUX.

According to a fifth aspect, a data backup method is provided. The method is applied to the debugging device according to the second aspect, and the method includes:

After the second interface is connected to a first interface of a user terminal, the connection component enables the user terminal to detect that the debugging device is connected to the user terminal.

An interface controller sends a data backup instruction to a main controller of the user terminal when detecting a data backup request instruction of a user.

The interface controller further sends an I/O instruction to a storage component of the user terminal to perform data backup processing.

In a possible implementation, the connection component includes a second CC controller.

After the debugging device is connected to the first interface of the user terminal through the second interface, the second CC controller sends a connection instruction to a first CC controller of the user terminal through the second interface, so that after receiving the connection instruction, the first CC controller determines that the debugging device is connected to the user terminal.

In a possible implementation, the connection component includes a resistor module.

After the debugging device is connected to the first interface of the user terminal through the second interface, the resistor module enables a first CC controller of the user terminal to switch from a high potential to a low potential, to determine that the debugging device is connected to the user terminal.

According to a sixth aspect, a data backup method is provided. The method is applied to the user terminal according to the third aspect, and the method includes:

When detecting a data backup request instruction of a user, a main controller sends a first signal switching instruction to a first MUX, and sends a second signal switching instruction to a second MUX.

The first MUX receives the first signal switching instruction, and connects the second signal input end to the first signal output end according to the first signal switching instruction.

The second MUX receives the second signal switching instruction, and connects a fourth signal input end to the second signal output end according to the second signal switching instruction.

When the second signal input end of the first MUX is connected to the first signal output end of the first MUX, and the fourth signal input end of the second MUX is connected to the second signal output end of the second MUX, the interface controller sends an I/O instruction to a storage component to perform data backup processing.

In a possible implementation, when the storage component is a storage component of a bus and interface PCIe type, the user terminal further includes a clock selector; and the method further includes:

The main controller sends a third signal switching instruction to the clock selector when receiving a data backup instruction.

The clock selector receives the third signal switching instruction, and connects a sixth signal input end to a third signal output end according to the third signal switching instruction.

The storage component receives a clock signal sent by the interface controller, to implement clock synchronization between the storage component and the interface controller.

In a possible implementation, the user terminal further includes an authentication information input component connected to the main controller; and the method further includes:

When receiving the data backup instruction, the main controller sends an authentication request instruction to the authentication information input component.

When receiving the authentication request instruction, the authentication information input component collects authentication information of a user, and sends an authentication response instruction to the main controller, where the authentication response instruction carries the authentication information.

When receiving the authentication response instruction, the main controller performs authentication on the user based on the authentication information and prestored user information, and if the authentication succeeds, sends the first signal switching instruction to the first MUX, and sends the second signal switching instruction to the second MUX.

In the embodiments of this application, when the I/O controller of the user terminal is faulty, a skilled person connects the debugging device to the first interface of the user terminal. In this case, the first CC controller sends the first signal switching instruction to the first MUX when detecting that the debugging device is connected to the first interface of the user terminal. After receiving the first signal switching instruction, the first MUX connects the second signal input end to the first signal output end, so that the main controller is connected to the debugging device through the first interface. Subsequently, the skilled person sends the data backup instruction to the main controller by using the debugging device. After receiving the data backup instruction, the main controller sends the second signal switching instruction to the second MUX, and sends the third signal switching instruction to the third MUX. After receiving the second signal switching instruction, the second MUX connects the fourth signal input end to the second signal output end. Similarly, after receiving the third signal switching instruction, the third MUX connects the sixth signal input end to the third signal output end. In this way, when the I/O controller of the user terminal is faulty, the skilled person directly sends the I/O instruction to the storage component by using the debugging device, to back up data in the storage component to a backup device connected to the debugging device.

DESCRIPTION OF EMBODIMENTS

Figure 1:
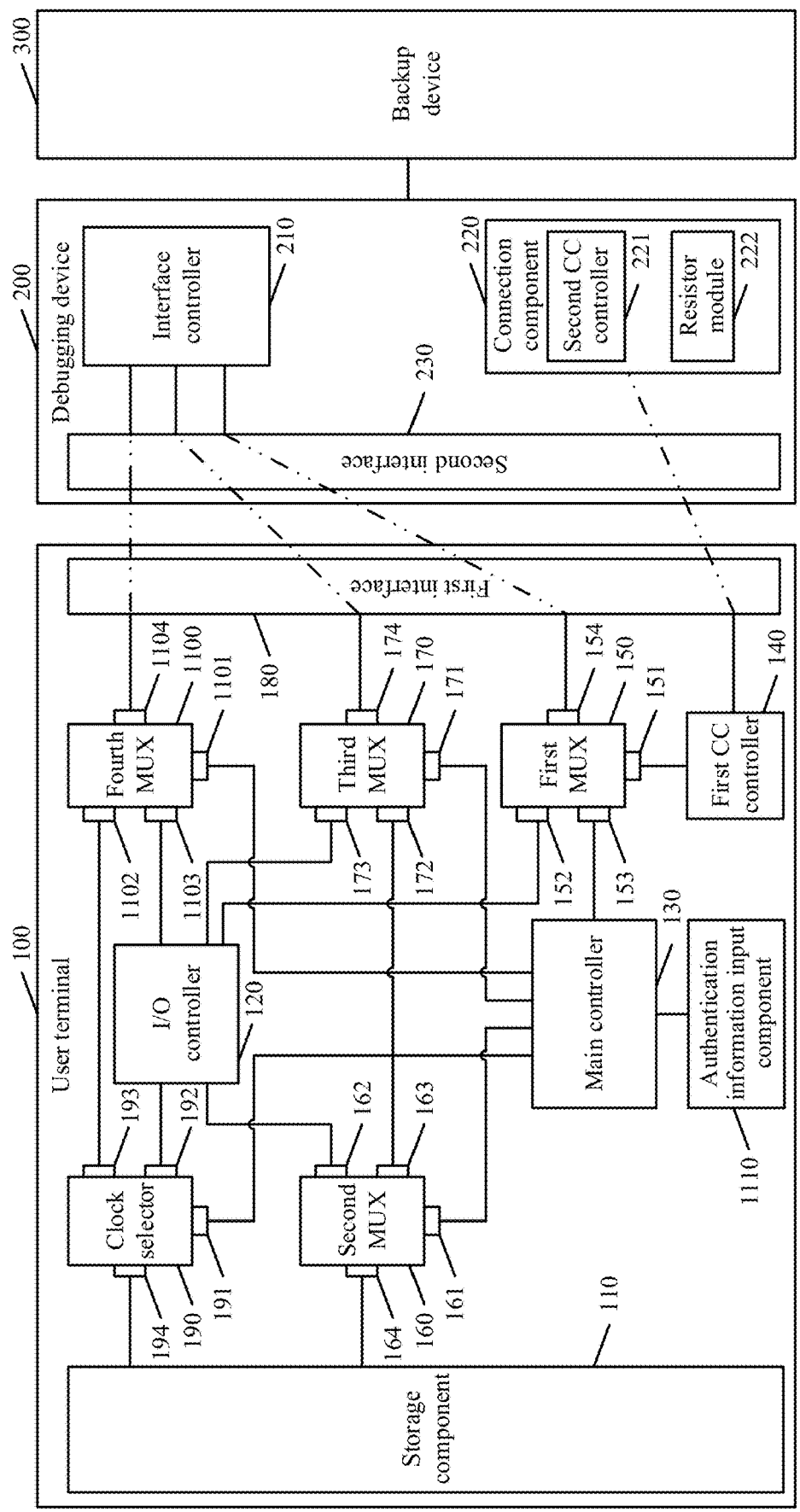
FIG. 1 is a schematic structural diagram in which a user terminal is externally connected to a debugging device according to an embodiment of this application.

FIG. 1 is a schematic structural diagram in which a user terminal is externally connected to a debugging device according to an embodiment of this application. As shown in FIG. 1, a user terminal 100 provided in this embodiment of this application includes a storage component 110, an input/output (input/output, I/O) controller 120, a main controller 130, a first configuration channel (configuration channel, CC) controller 140, a first multiplexer (multiplexer, MUX) 150, a second MUX 160, a third MUX 170, and a first interface 180. The storage component 110 is a storage component of a peripheral component interconnect express (PCIe) type, is a storage component of a serial advanced technology attachment (serial advanced technology attachment, SATA) type, or is a storage component of another type. This is not limited in this embodiment of this application. The first interface 180 is a type-C first interface, or is a first interface of another type. This is not limited in this embodiment of this application. The following describes in detail connection relationships between and functions of the storage component 110, the I/O controller 120, the main controller 130, the first CC controller 140, the first MUX 150, the second MUX 160, the third MUX 170, and the first interface 180 that are of the user terminal 100. Details are as follows:

The first CC controller 140 is connected to each of the first interface 180 and a first signal selection input end 151 of the first MUX 150, and is configured to send a first signal switching instruction to the first MUX 150 when detecting that a debugging device 200 is connected to the first interface 180 of the user terminal 100.

A first signal input end 152 of the first MUX 150 is connected to the I/O controller 120, a second signal input end 153 of the first MUX 150 is connected to the main controller 130, and a first signal output end 154 of the first MUX 150 is connected to the first interface 180; and the first MUX 150 is configured to connect the second signal input end 153 to the first signal output end 154 when receiving the first signal switching instruction, so that the main controller 130 receives, through the first interface 180, a data backup instruction sent by the debugging device 200.

The main controller 130 is connected to each of a second signal selection input end 161 of the second MUX 160 and a third signal selection input end 171 of the third MUX 170, and is configured to: when receiving the data backup instruction, send a second signal switching instruction to the second MUX 160, and send a third signal switching instruction to the third MUX 170.

A third signal input end 162 of the second MUX 160 is connected to the I/O controller 120, a fourth signal input end 163 of the second MUX 160 is connected to a sixth signal input end 172 of the third MUX 170, and a second signal output end 164 of the second MUX 160 is connected to the storage component 110; and the second MUX 160 is configured to connect the fourth signal input end 163 to the second signal output end 164 when receiving the second signal switching instruction.

A fifth signal input end 173 of the third MUX 170 is connected to the I/O controller 120, and a third signal output end 174 of the third MUX 170 is connected to the first interface 180; and the third MUX 170 is configured to connect the sixth signal input end 172 to the third signal output end 174 when receiving the third signal switching instruction.

The storage component 110 is configured to: when the fourth signal input end 163 of the second MUX 160 is connected to the second signal output end 164 of the second MUX 160, and the sixth signal input end 172 of the third MUX 170 is connected to the third signal output end 174 of the third MUX 170, receive an I/O instruction sent by the debugging device 200, and perform data backup processing according to the I/O instruction.

In an implementation, when the I/O controller 120 of the user terminal 100 works normally, the first signal input end 152 of the first MUX 150 is connected to the first signal output end 154 of the first MUX 150, the third signal input end 162 of the second MUX 160 is connected to the second signal output end 164 of the second MUX 160, and the fifth signal input end 173 of the third MUX 170 is connected to the third signal output end 174 of the third MUX 170. In this case, a skilled person directly connects a backup device 300 to the first interface 180 of the user terminal 100, and send an I/O instruction to the storage component 110 by using the I/O controller 120, to back up data in the storage component 110 to the backup device 300.

However, when the I/O controller 120 of the user terminal 100 is faulty, the skilled person connects the debugging device 200 to the first interface 180 of the user terminal 100. In this case, the first CC controller 140 sends the first signal switching instruction to the first MUX 150 when detecting that the debugging device 200 is connected to the first interface 180 of the user terminal 100. After receiving the first signal switching instruction, the first MUX 150 connects the second signal input end 153 to the first signal output end 154, so that the main controller 130 is connected to the debugging device 200 through the first interface 180. Subsequently, the skilled person sends the data backup instruction to the main controller 130 by using the debugging device 200. After receiving the data backup instruction, the main controller 130 sends the second signal switching instruction to the second MUX 160, and sends the third signal switching instruction to the third MUX 170. After receiving the second signal switching instruction, the second MUX 160 connects the fourth signal input end 163 to the second signal output end 164. Similarly, after receiving the third signal switching instruction, the third MUX 170 connects the sixth signal input end 172 to the third signal output end 174. In this way, when the I/O controller 120 of the user terminal 100 is faulty, the skilled person directly sends the I/O instruction to the storage component 110 by using the debugging device 200, to back up data in the storage component 110 to the backup device 300 connected to the debugging device 200.

Optionally, the user terminal 100 further includes an authentication information input component 1110 connected to the main controller 130.

The main controller 130 is further configured to: when receiving the data backup instruction, send an authentication request instruction to the authentication information input component 1110.

The authentication information input component 1110 is configured to: when receiving the authentication request instruction, collect authentication information of a user, and send an authentication response instruction to the main controller 130, where the authentication response instruction carries the authentication information.

The main controller 130 is further configured to: when receiving the authentication response instruction, perform authentication on the user based on the authentication information and prestored user information, and if the authentication succeeds, send the second signal switching instruction to the second MUX 160, and send the third signal switching instruction to the third MUX 170.

In an implementation, the main controller 130 prestores the user information, where the user information is fingerprint information, a password, or the like. When the main controller 130 receives the data backup instruction, the main controller 130 sends the authentication request instruction to the authentication information input component 1110, to ensure security of the data in the storage component 110. Then, after receiving the authentication request instruction, the authentication information input component 1110 collects the authentication information of the user, and send the authentication response instruction to the main controller 130, where the authentication response instruction carries the authentication information. Subsequently, after receiving the authentication response instruction, the main controller 130 parses the authentication response instruction, to learn that the authentication response instruction carries the authentication information. After obtaining the authentication information, the main controller 130 queries whether the authentication information exists in the prestored user information. If the authentication information exists in the prestored user information, the authentication information indicates that the authentication succeeds. In this case, the main controller 130 further sends the second signal switching instruction to the second MUX 160, and send the third signal switching instruction to the third MUX 170.

User terminal 100 further includes a display connected to the main controller 130. When the main controller 130 receives the data backup instruction, the main controller 130 further prompts, through the display, the user to enter the authentication information.

In addition, the display is further disposed in the debugging device 200. When the main controller 130 receives the data backup instruction, the main controller 130 sends a display instruction to the debugging device 200, so that the display prompts the user to enter the authentication information.

Optionally, when the storage component 110 is a storage component of a PCIe type, the user terminal 100 further includes a clock selector 190 and a fourth MUX 1100.

The main controller 130 is connected to each of a fourth signal selection input end 191 of the clock selector 190 and a fifth signal selection input end 1101 of the fourth MUX 1100, and is configured to: when receiving the data backup instruction, send a fourth signal switching instruction to the clock selector 190, and send a fifth signal switching instruction to the fourth MUX 1100.

A seventh signal input end 192 of the clock selector 190 is connected to the I/O controller 120, an eighth signal input end 193 of the clock selector 190 is connected to a tenth signal input end 1102 of the fourth MUX 1100, and a fourth signal output end 194 of the clock selector 190 is connected to the storage component 110; and the clock selector 190 is configured to connect the eighth signal input end 193 to the fourth signal output end 194 when receiving the fourth signal switching instruction.

A ninth signal input end 1103 of the fourth MUX 1100 is connected to the I/O controller 120, and a fifth signal output end 1104 of the fourth MUX 1100 is connected to the first interface 180; and the fourth MUX 1100 is configured to connect the tenth signal input end 1102 to the fifth signal output end 1104 when receiving the fifth signal switching instruction.

The storage component 110 is further configured to: when the eighth signal input end 193 of the clock selector 190 is connected to the fourth signal output end 194 of the clock selector 190, and the tenth signal input end 1102 of the fourth MUX 1100 is connected to the fifth signal output end 1104 of the fourth MUX 1100, receive a clock signal sent by the debugging device 200, to implement clock synchronization between the storage component 110 and the debugging device 200.

In an implementation, when the I/O controller 120 of the user terminal 100 works normally, the seventh signal input end 192 of the clock selector 190 is connected to the fourth signal output end 194 of the clock selector 190, and the ninth signal input end 1103 of the fourth MUX 1100 is connected to the fifth signal output end 1104 of the fourth MUX 1100. In this case, the I/O controller 120 sends clock information to the storage component 110, to ensure clock synchronization between the storage component 110 and the I/O controller 120.

However, when the I/O controller 120 of the user terminal 100 is faulty, a skilled person sends the data backup instruction to the main controller 130 by using the debugging device 200. After receiving the data backup instruction, the main controller 130 sends the fourth signal switching instruction to the clock selector 190, and sends the fifth signal switching instruction to the fourth MUX 1100. After receiving the fourth signal switching instruction, the clock selector 190 connects the eighth signal input end 193 to the fourth signal output end 194. Similarly, after receiving the fifth signal switching instruction, the fourth MUX 1100 connects the tenth signal input end 1102 to the fifth signal output end 1104. In this way, when the I/O controller 120 of the user terminal 100 is faulty, the debugging device 200 directly sends the clock signal to the storage component 110, to ensure clock synchronization between the storage component 110 and the debugging device 200.

Refer to FIG. 1. The debugging device 200 provided in this embodiment of this application includes an interface controller 210, a connection component 220, and a second interface 230. The second interface 230 is a type-C second interface, or is a second interface of another type. This is not limited in this embodiment of this application. The following describes in detail connection relationships between and functions of the interface controller 210, the connection component 220, and the second interface 230 that are of the debugging device 200. Details are as follows:

The connection component 220 is connected to the second interface 230, and is configured to: after the second interface 230 is connected to the first interface 180 of the user terminal 100, enable the user terminal 100 to detect that the debugging device 200 is connected to the user terminal.

The interface controller 210 is connected to the second interface 230, and is configured to send a data backup instruction to the main controller 130 of the user terminal 100 when detecting a data backup request instruction of a user.

The interface controller 210 is further configured to send an I/O instruction to the storage component 110 of the user terminal 100 to perform data backup processing.

In an implementation, when the I/O controller 120 of the user terminal 100 is faulty, a skilled person connects the second interface 230 of the debugging device 200 to the first interface 180 of the user terminal 100. In this case, the first CC controller 140 detects, by using the connection component 220 of the debugging device 200, that the debugging device 200 is connected to the user terminal 100, and sends the first signal switching instruction to the first MUX 150. After receiving the first signal switching instruction, the first MUX 150 connects the second signal input end 153 to the first signal output end 154, so that the main controller 130 is connected to the interface controller 210 of the debugging device 200. Subsequently, when detecting the data backup request instruction of the user, the interface controller 210 sends the data backup instruction to the main controller 130. After receiving the data backup instruction, the main controller 130 sends the second signal switching instruction to the second MUX 160, and sends the third signal switching instruction to the third MUX 170. After receiving the second signal switching instruction, the second MUX 160 connects the fourth signal input end 163 to the second signal output end 164. Similarly, after receiving the third signal switching instruction, the third MUX 170 connects the sixth signal input end 172 to the third signal output end 174. In this way, when the I/O controller 120 of the user terminal 100 is faulty, the skilled person directly sends the I/O instruction to the storage component 110 by using the interface controller 210 of the debugging device 200, to back up data in the storage component 110 to the backup device 300 connected to the debugging device 200.

A data backup request button is further disposed in the debugging device 200. The interface controller 210 monitors a level status of the data backup request button through a GPIO. When detecting, through the GPIO, that a level of the data backup request button is a high level, the interface controller 210 determines that the user initiates a data backup request. The interface controller 210 further monitors level statuses of a plurality of data backup request buttons through a plurality of GPIOs. When detecting, through a GPIO, that a level of a specific data backup request button is a high level, the interface controller 210 determines that the user initiates a data backup request.

Optionally, the first CC controller 140 detects, by using the connection component 220 of the debugging device 200 in various manners, that the debugging device 200 is connected to the user terminal 100. This embodiment of this application provides two feasible implementations. Details are as follows:

Implementation 1: The connection component 220 includes a second CC controller 221. The second CC controller 221 is connected to the second interface 230, and is configured to: after the second interface 230 is connected to the first interface 180 of the user terminal 100, send a connection instruction to the first CC controller 140 of the user terminal 100 through the second interface 230, so that after receiving the connection instruction, the first CC controller 140 determines that the debugging device 200 is connected to the user terminal 100.

In an implementation, when the second interface 230 of the debugging device 200 is connected to the first interface 180 of the user terminal 100, the second CC controller 221 is connected to the first CC controller 140. The second CC controller 221 sends the connection instruction to the first CC controller 140. After receiving the connection instruction, the first CC controller 140 determines that the debugging device 200 is connected to the user terminal 100. The connection instruction is a structured vendor defined message (structured vendor defined message, VDM) or an unstructured vendor defined message (unstructured vendor defined message, UVDM).

Optionally, the second CC controller 221 prestores a first key. When the second interface 230 of the debugging device 200 is connected to the first interface 180 of the user terminal 100, the second CC controller 221 sends an encrypted connection instruction to the first CC controller 140. The encrypted connection instruction is obtained after the second CC controller 221 encrypts the connection instruction based on the prestored first key. Correspondingly, the first CC controller 140 prestores a second key corresponding to the first key. When receiving the encrypted connection instruction, the first CC controller 140 decrypts the encrypted connection instruction based on the prestored second key. If the decryption succeeds, the first CC controller 140 determines that authentication on the debugging device 200 succeeds. If the decryption fails, the first CC controller 140 determines that authentication on the debugging device 200 fails.

Implementation 2: The connection component 220 includes a resistor module 222. The resistor module 222 is connected to the second interface 230, and is configured to: after the debugging device 200 is connected to the first interface 180 of the user terminal 100 through the second interface 230, enable the first CC controller 140 of the user terminal 100 to switch from a high potential to a low potential, to determine that the debugging device 200 is connected to the user terminal 100.

In an implementation, when the second interface 230 of the debugging device 200 is connected to the first interface 180 of the user terminal 100, the first CC controller 140 is connected to the resistor module 222. When the first CC controller 140 detects that potentials of a pin CC 1 and a pin CC 2 each are switched from a high potential to a low potential, the first CC controller 140 enters a debug accessory mode (debug accessory mode), and determines that the debugging device 200 is connected to the user terminal 100.

Figure 2:
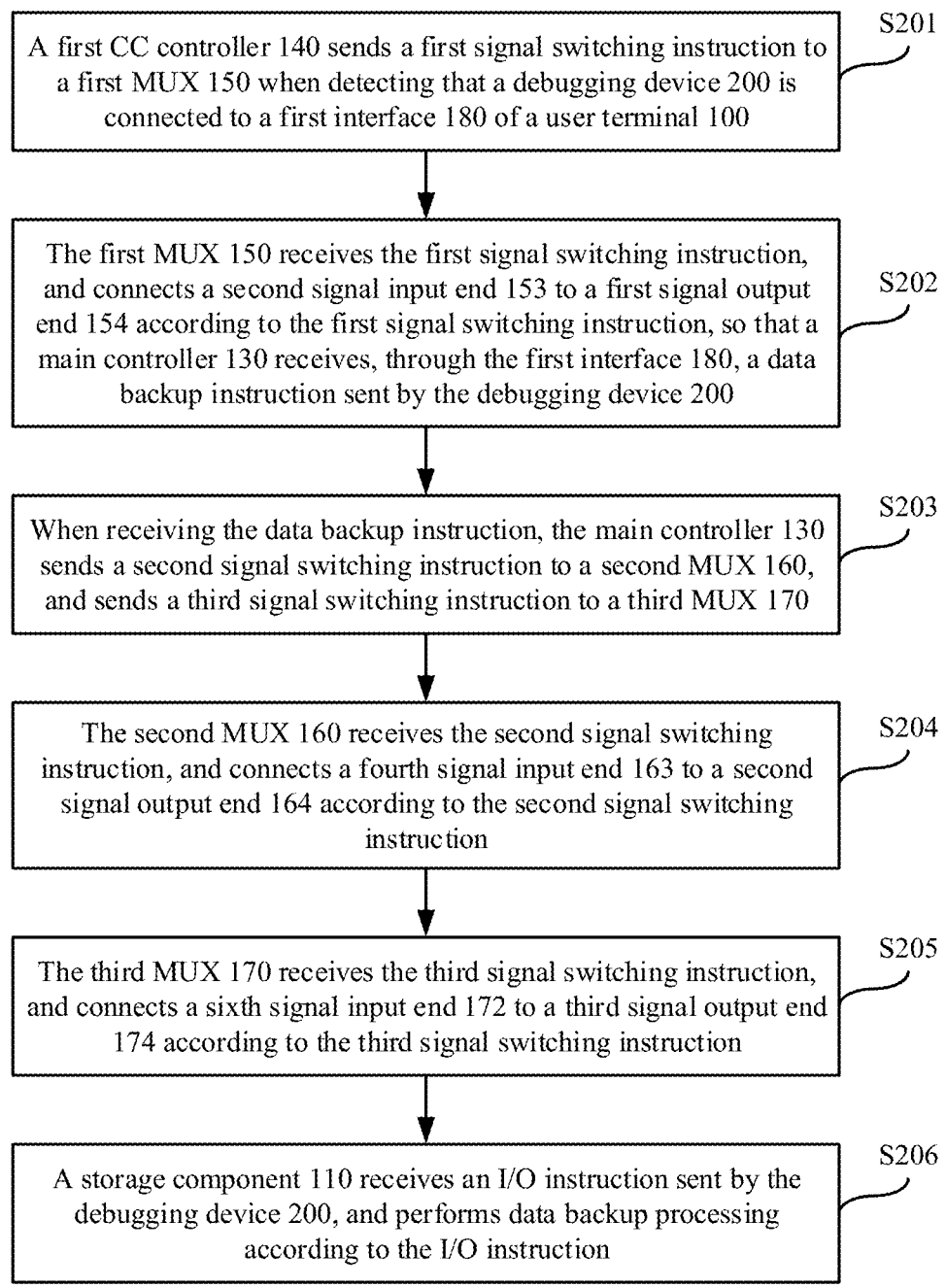
FIG. 2 is a flowchart of a data backup method according to an embodiment of this application.

Based on a same technical concept, an embodiment of this application further provides a data backup method. The method is applied to the user terminal 100. As shown in FIG. 2, the method includes the following steps.

Step 201: The first CC controller 140 sends a first signal switching instruction to the first MUX 150 when detecting that the debugging device 200 is connected to the first interface 180 of the user terminal 100.

In an implementation, when the I/O controller 120 of the user terminal 100 is faulty, a skilled person connects the debugging device 200 to the first interface 180 of the user terminal 100. In this case, the first CC controller 140 sends the first signal switching instruction to the first MUX 150 when detecting that the debugging device 200 is connected to the first interface 180 of the user terminal 100.

Step 202: The first MUX 150 receives the first signal switching instruction, and connects the second signal input end 153 to the first signal output end 154 according to the first signal switching instruction, so that the main controller 130 receives, through the first interface 180, a data backup instruction sent by the debugging device 200.

In an implementation, after receiving the first signal switching instruction, the first MUX 150 connects the second signal input end 153 to the first signal output end 154, so that the main controller 130 is connected to the debugging device 200 through the first interface 180, and receives the data backup instruction sent by the debugging device 200.

Step 203: When receiving the data backup instruction, the main controller 130 sends a second signal switching instruction to the second MUX 160, and sends a third signal switching instruction to the third MUX 170.

In an implementation, the skilled person sends the data backup instruction to the main controller 130 by using the debugging device 200. After receiving the data backup instruction, the main controller 130 sends the second signal switching instruction to the second MUX 160, and sends the third signal switching instruction to the third MUX 170.

Optionally, the user terminal 100 further includes the authentication information input component 1110 connected to the main controller 130. When receiving the data backup instruction, the main controller 130 sends an authentication request instruction to the authentication information input component 1110. When receiving the authentication request instruction, the authentication information input component 1110 collects authentication information of a user, and sends an authentication response instruction to the main controller 130, where the authentication response instruction carries the authentication information. When receiving the authentication response instruction, the main controller 130 performs authentication on the user based on the authentication information and prestored user information, and if the authentication succeeds, sends the second signal switching instruction to the second MUX 160, and sends the third signal switching instruction to the third MUX 170.

In an implementation, the main controller 130 prestores the user information, where the user information is fingerprint information, a password, or the like. When the main controller 130 receives the data backup instruction, the main controller 130 sends the authentication request instruction to the authentication information input component 1110, to ensure security of the data in the storage component 110. Then, after receiving the authentication request instruction, the authentication information input component 1110 collects the authentication information of the user, and send the authentication response instruction to the main controller 130, where the authentication response instruction carries the authentication information. Subsequently, after receiving the authentication response instruction, the main controller 130 parses the authentication response instruction, to learn that the authentication response instruction carries the authentication information. After obtaining the authentication information, the main controller 130 queries whether the authentication information exists in the prestored user information. If the authentication information exists in the prestored user information, the authentication information indicates that the authentication succeeds. In this case, the main controller 130 further sends the second signal switching instruction to the second MUX 160, and send the third signal switching instruction to the third MUX 170.

User terminal 100 further includes a display connected to the main controller 130. When the main controller 130 receives the data backup instruction, the main controller 130 further prompts, through the display, the user to enter the authentication information.

In addition, the display is further disposed in the debugging device 200. When the main controller 130 receives the data backup instruction, the main controller 130 sends a display instruction to the debugging device 200, so that the display prompts the user to enter the authentication information.

Step 204: The second MUX 160 receives the second signal switching instruction, and connects the fourth signal input end 163 to the second signal output end 164 according to the second signal switching instruction.

In an implementation, after receiving the second signal switching instruction, the second MUX 160 connects the fourth signal input end 163 to the second signal output end 164.

Step 205: The third MUX 170 receives the third signal switching instruction, and connects the sixth signal input end 172 to the third signal output end 174 according to the third signal switching instruction.

In an implementation, after receiving the third signal switching instruction, the third MUX 170 connects the sixth signal input end 172 to the third signal output end 174.

Step 206: The storage component 110 receives an I/O instruction sent by the debugging device 200, and performs data backup processing according to the I/O instruction.

In an implementation, the skilled person directly sends the I/O instruction to the storage component 110 by using the debugging device 200, to back up data in the storage component 110 to the backup device 300 connected to the debugging device 200.

Optionally, when the storage component is a storage component of a bus and interface PCIe type, the user terminal further includes the clock selector 190 and the fourth MUX 1100. Correspondingly, the main controller 130 further needs to ensure clock synchronization between the storage component 110 and the debugging device 200. A specific processing process is as follows:

Step 1: When receiving the data backup instruction, the main controller 130 sends a fourth signal switching instruction to the clock selector 190, and sends a fifth signal switching instruction to the fourth MUX 1100.

In an implementation, after receiving the data backup instruction, the main controller 130 sends the fourth signal switching instruction to the clock selector 190, and sends the fifth signal switching instruction to the fourth MUX 1100.

Step 2: The clock selector 190 receives the fourth signal switching instruction, and connects the eighth signal input end 193 to the fourth signal output end 194 according to the fourth signal switching instruction.

In an implementation, after receiving the fourth signal switching instruction, the clock selector 190 connects the eighth signal input end 193 to the fourth signal output end 194.

Step 3: The fourth MUX 1100 receives the fifth signal switching instruction, and connects the tenth signal input end 1102 to the fifth signal output end 1104 according to the fifth signal switching instruction.

In an implementation, after receiving the fifth signal switching instruction, the fourth MUX 1100 connects the tenth signal input end 1102 to the fifth signal output end 1104.

Step 4: The storage component 110 receives a clock signal sent by the debugging device 200, to implement clock synchronization between the storage component 110 and the debugging device 200.

In an implementation, the debugging device 200 directly sends the clock signal to the storage component 110, to ensure clock synchronization between the storage component 110 and the debugging device 200.

Figure 3:
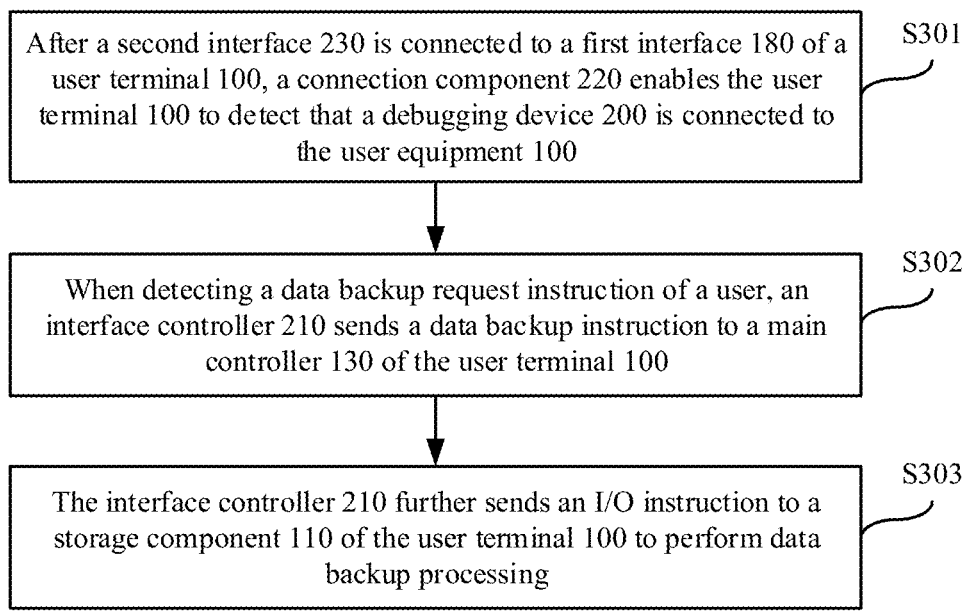
FIG. 3 is a flowchart of a data backup method according to an embodiment of this application.

Based on a same technical concept, an embodiment of this application further provides a data backup method. The method is applied to the debugging device 200. As shown in FIG. 3, the method includes the following steps.

Step 301: After the second interface 230 is connected to the first interface 180 of the user terminal 100, the connection component 220 enables the user terminal 100 to detect that the debugging device 200 is connected to the user terminal 100.

In an implementation, when the I/O controller 120 of the user terminal 100 is faulty, a skilled person connects the second interface 230 of the debugging device 200 to the first interface 180 of the user terminal 100. The first CC controller 140 detects, by using the connection component 220 of the debugging device 200, that the debugging device 200 is connected to the user terminal 100.

Optionally, the first CC controller 140 detects, by using the connection component 220 of the debugging device 200 in various manners, that the debugging device 200 is connected to the user terminal 100. This embodiment of this application provides two feasible implementations. Details are as follows:

Implementation 1: The connection component 220 includes the second CC controller 221. After the debugging device 200 is connected to the first interface 180 of the user terminal 100 through the second interface 230, the second CC controller 221 sends a connection instruction to the first CC controller 140 of the user terminal 100 through the second interface 230, so that after receiving the connection instruction, the first CC controller 140 determines that the debugging device 200 is connected to the user terminal 100.

In an implementation, when the second interface 230 of the debugging device 200 is connected to the first interface 180 of the user terminal 100, the second CC controller 221 is connected to the first CC controller 140. The second CC controller 221 sends the connection instruction to the first CC controller 140. After receiving the connection instruction, the first CC controller 140 determines that the debugging device 200 is connected to the user terminal 100, where the connection instruction is a VDM or a UVDM.

Optionally, the second CC controller 221 prestores a first key. When the second interface 230 of the debugging device 200 is connected to the first interface 180 of the user terminal 100, the second CC controller 221 sends an encrypted connection instruction to the first CC controller 140. The encrypted connection instruction is obtained after the second CC controller 221 encrypts the connection instruction based on the prestored first key. Correspondingly, the first CC controller 140 prestores a second key corresponding to the first key. When receiving the encrypted connection instruction, the first CC controller 140 decrypts the encrypted connection instruction based on the prestored second key. If the decryption succeeds, the first CC controller 140 determines that authentication on the debugging device 200 succeeds. If the decryption fails, the first CC controller 140 determines that authentication on the debugging device 200 fails.

Implementation 2: The connection component 220 includes the resistor module 222. After the debugging device 200 is connected to the first interface 180 of the user terminal 100 through the second interface 230, the resistor module 222 enables the first CC controller 140 of the user terminal 100 to switch from a high potential to a low potential, to determine that the debugging device 200 is connected to the user terminal 100.

In an implementation, when the second interface 230 of the debugging device 200 is connected to the first interface 180 of the user terminal 100, the first CC controller 140 is connected to the resistor module 222. When the first CC controller 140 detects that potentials of a pin CC 1 and a pin CC 2 each are switched from a high potential to a low potential, the first CC controller 140 enters a debug accessory mode (debug accessory mode), and determines that the debugging device 200 is connected to the user terminal 100.

Step 302: When detecting a data backup request instruction of a user, the interface controller 210 sends a data backup instruction to the main controller 130 of the user terminal 100.

In an implementation, when detecting the data backup request instruction of the user, the interface controller 210 sends the data backup instruction to the main controller 130. After receiving the data backup instruction, the main controller 130 sends a second signal switching instruction to the second MUX 160, and sends a third signal switching instruction to the third MUX 170. After receiving the second signal switching instruction, the second MUX 160 connects the fourth signal input end 163 to the second signal output end 164. Similarly, after receiving the third signal switching instruction, the third MUX 170 connects the sixth signal input end 172 to the third signal output end 174.

A data backup request button is further disposed in the debugging device 200. The interface controller 210 monitors a level status of the data backup request button through a GPIO. When detecting, through the GPIO, that a level of the data backup request button is a high level, the interface controller 210 determines that the user initiates a data backup request. The interface controller 210 further monitors level statuses of a plurality of data backup request buttons through a plurality of GPIOs. When detecting, through a GPIO, that a level of a specific data backup request button is a high level, the interface controller 210 determines that the user initiates a data backup request.

Step 303: The interface controller 210 further sends an I/O instruction to the storage component 110 of the user terminal 100 to perform data backup processing.

In an implementation, the skilled person directly sends the I/O instruction to the storage component 110 by using the interface controller 210 of the debugging device 200, to back up data in the storage component 110 to the backup device 300 connected to the debugging device 200.

Figure 4:
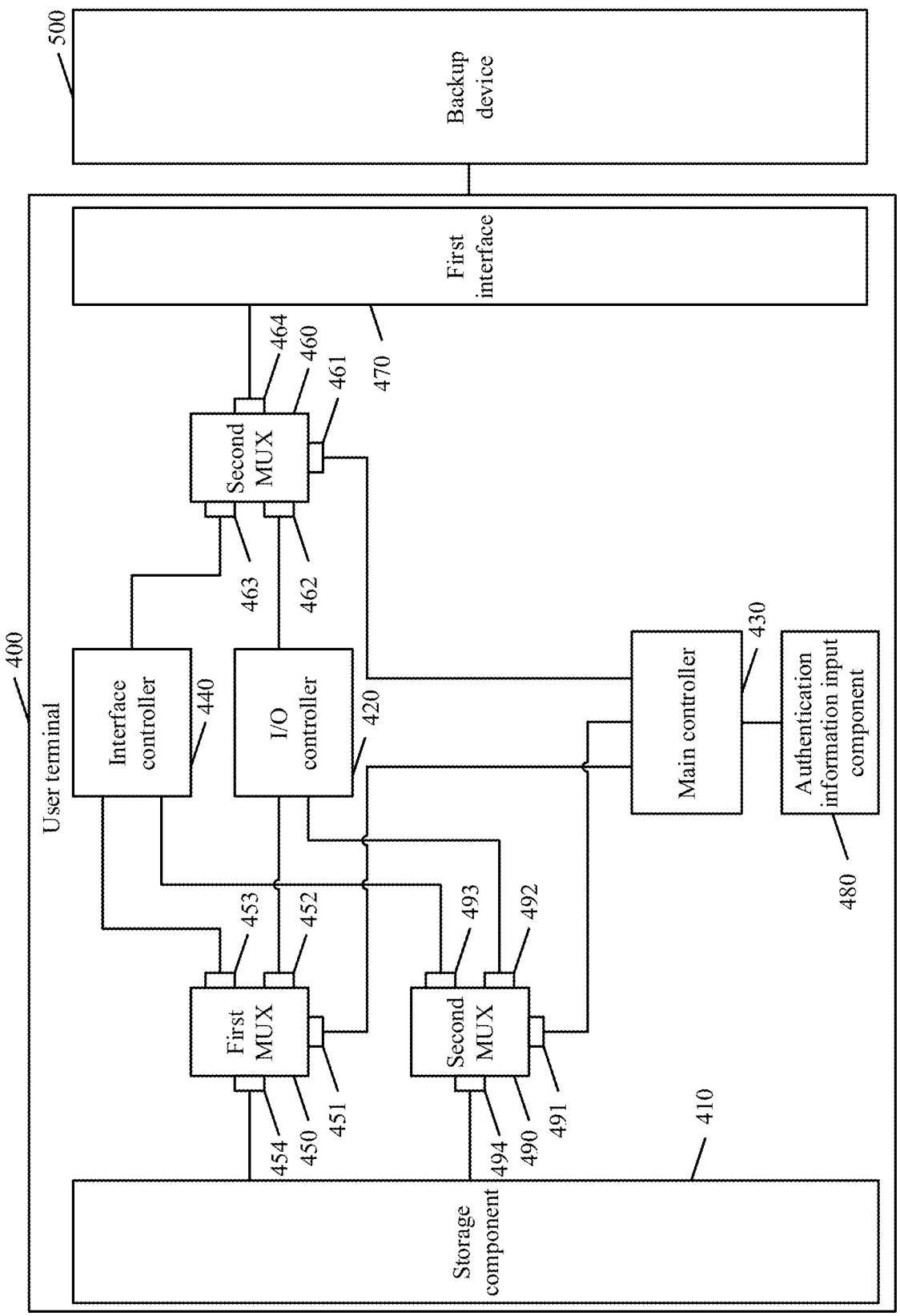
FIG. 4 is a schematic structural diagram of a user terminal according to an embodiment of this application.

FIG. 4 is a schematic structural diagram of a user terminal according to an embodiment of this application. As shown in FIG. 4, the user terminal 400 includes a storage component 410, an I/O controller 420, a main controller 430, an interface controller 440, a first MUX 450, a second MUX 460, and a first interface 470. The storage component 410 is a storage component of a PCIe type, is a storage component of an SATA type, or is a storage component of another type. This is not limited in this embodiment of this application. The first interface 470 is a type-C first interface, or is a first interface of another type. This is not limited in this embodiment of this application. The following describes in detail connection relationships between and functions of the storage component 410, the I/O controller 420, the main controller 430, the interface controller 440, the first MUX 450, the second MUX 460, and the first interface 470 that are of the user terminal 400. Details are as follows:

The main controller 430 is connected to each of a first signal selection input end 451 of the first MUX 450 and a second signal selection input end 461 of the second MUX 460, and is configured to: when receiving a data backup request instruction, send a first signal switching instruction to the first MUX 450, and send a second signal switching instruction to the second MUX 460.

A first signal input end 452 of the first MUX 450 is connected to the I/O controller 420, a second signal input end 453 of the first MUX 450 is connected to the interface controller 440, and a first signal output end 454 of the first MUX 450 is connected to the storage component 410; and the first MUX 450 is configured to connect the second signal input end 453 to the first signal output end 454 when receiving the first signal switching instruction.

A third signal input end 462 of the second MUX 460 is connected to the I/O controller 420, a fourth signal input end 463 of the second MUX 460 is connected to the interface controller 440, and a second signal output end 464 of the second MUX 460 is connected to the first interface 470; and the second MUX 460 is configured to connect the fourth signal input end 463 to the second signal output end 464 when receiving the second signal switching instruction.

The interface controller 440 is configured to: when the second signal input end 453 of the first MUX 450 is connected to the first signal output end 454 of the first MUX 450, and the fourth signal input end 463 of the second MUX 460 is connected to the second signal output end 464 of the second MUX 460, send an I/O instruction to the storage component 110 to perform data backup processing.

In an implementation, when the I/O controller 420 of the user terminal 400 works normally, the first signal input end 452 of the first MUX 450 is connected to the first signal output end 454 of the first MUX 450, and the third signal input end 462 of the second MUX 460 is connected to the second signal output end 464 of the second MUX 460. In this case, a skilled person directly connects a backup device 500 to the first interface 470 of the user terminal 400, and send the I/O instruction to the storage component 410 by using the I/O controller 420, to back up data in the storage component 410 to the backup device 500.

However, when the I/O controller 420 of the user terminal 400 is faulty, a skilled person sends a data backup request instruction to the main controller 430 after connecting the backup device 500 to the first interface 470 of the user terminal 400. After receiving the data backup request instruction, the main controller 430 sends the first signal switching instruction to the first MUX 450, and send the second signal switching instruction to the second MUX 460. After receiving the first signal switching instruction, the first MUX 450 connects the second signal input end 453 to the first signal output end 454. Similarly, after receiving the second signal switching instruction, the second MUX 460 connects the fourth signal input end 463 to the second signal output end 464. In this way, when the I/O controller 420 of the user terminal 400 is faulty, the skilled person directly sends the I/O instruction to the storage component 410 by using the interface controller 440 of the user terminal 400, to back up data in the storage component 410 to the backup device 500.

Optionally, the user terminal 400 further includes an authentication information input component 480 connected to the main controller 430.

The main controller 430 is further configured to: when receiving the data backup instruction, send an authentication request instruction to the authentication information input component 480.

The authentication information input component 480 is configured to: when receiving the authentication request instruction, collect authentication information of a user, and send an authentication response instruction to the main controller 430, where the authentication response instruction carries the authentication information.

The main controller 430 is further configured to: when receiving the authentication response instruction, perform authentication on the user based on the authentication information and prestored user information, and if the authentication succeeds, send the first signal switching instruction to the first MUX 450, and send the second signal switching instruction to the second MUX 460.

In an implementation, the main controller 430 prestores the user information, where the user information is fingerprint information, a password, or the like. When the main controller 430 receives the data backup instruction, the main controller 430 sends the authentication request instruction to the authentication information input component 480, to ensure security of the data in the storage component 410. Then, after receiving the authentication request instruction, the authentication information input component 480 collects the authentication information of the user, and send the authentication response instruction to the main controller 430, where the authentication response instruction carries the authentication information. Subsequently, after receiving the authentication response instruction, the main controller 430 parses the authentication response instruction, to learn that the authentication response instruction carries the authentication information. After obtaining the authentication information, the main controller 430 queries whether the authentication information exists in the prestored user information. If the authentication information exists in the prestored user information, the authentication information indicates that the authentication succeeds. In this case, the main controller 430 further sends the first signal switching instruction to the first MUX 450, and send the second signal switching instruction to the second MUX 460.

User terminal 400 further includes a display connected to the main controller 430. When the main controller 430 receives the data backup instruction, the main controller 430 further prompts, through the display, the user to enter the authentication information.

Optionally, when the storage component 410 is a storage component of a PCIe type, the user terminal 400 further includes a clock selector 490.

The main controller 430 is connected to a third signal selection input end 491 of the clock selector 490, and is configured to send a third signal switching instruction to the clock selector 490 when receiving the data backup instruction.

A fifth signal input end 492 of the clock selector 490 is connected to the I/O controller 420, a sixth signal input end 493 of the clock selector 490 is connected to the interface controller 440, and a third signal output end 494 of the clock selector 490 is connected to the storage component 410; and the clock selector 490 is configured to connect the sixth signal input end 493 to the third signal output end 494 when receiving the third signal switching instruction.

The storage component 410 is further configured to: when the sixth signal input end 493 of the clock selector 490 is connected to the third signal output end 494 of the clock selector 490, receive a clock signal sent by the interface controller 440, to implement clock synchronization between the storage component 410 and the interface controller 440.

In an implementation, when the I/O controller 420 of the user terminal 400 works normally, the fifth signal input end 492 of the clock selector 490 is connected to the third signal output end 494 of the clock selector 490. In this case, the I/O controller 420 sends clock information to the storage component 410, to ensure clock synchronization between the storage component 410 and the I/O controller 420.

However, when the I/O controller 420 of the user terminal 400 is faulty, a skilled person sends a data backup request instruction to the main controller 430 after connecting the backup device 500 to the first interface 470 of the user terminal 400. The main controller 430 sends the third signal switching instruction to the clock selector 490 after receiving the data backup request instruction. After receiving the third signal switching instruction, the clock selector 490 connects the sixth signal input end 493 to the third signal output end 494. In this way, the interface controller 440 directly sends the clock signal to the storage component 410, to ensure clock synchronization between the storage component 410 and the interface controller 440.

Figure 5:
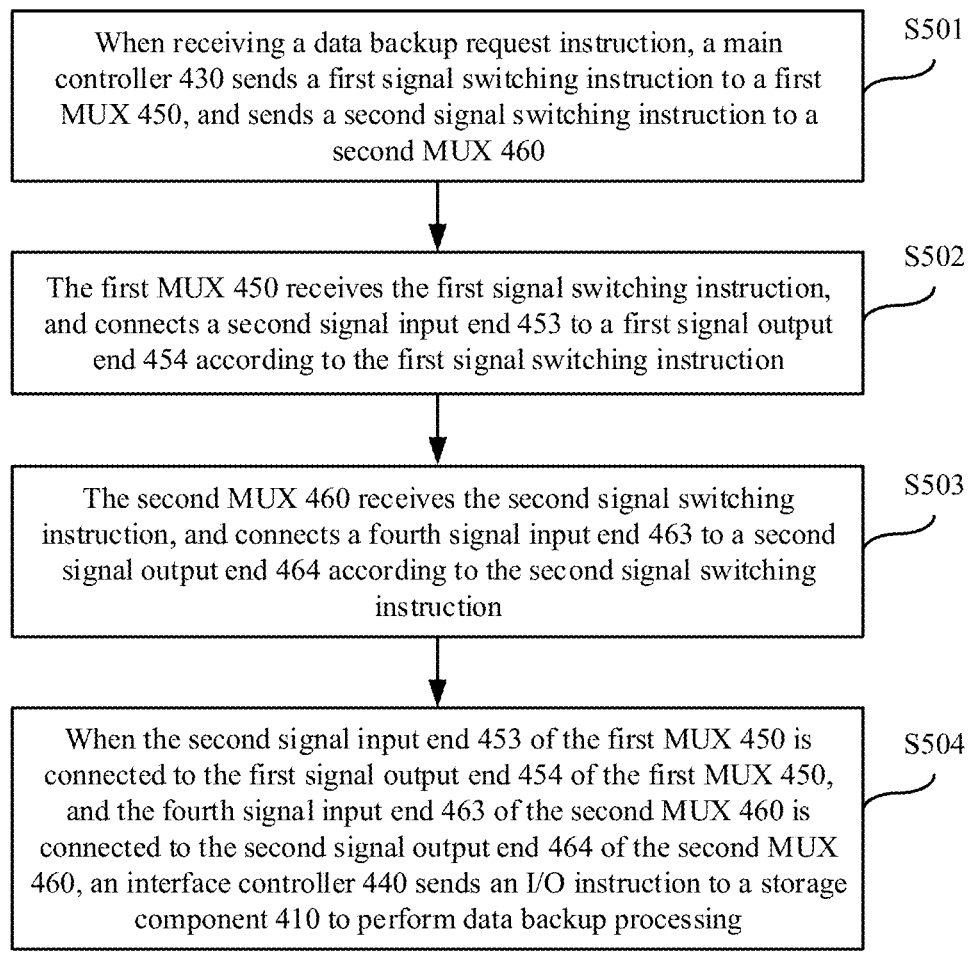
FIG. 5 is a flowchart of a data backup method according to an embodiment of this application.

Based on a same technical concept, an embodiment of this application further provides a data backup method. The method is applied to the user terminal 400. As shown in FIG. 5, the method includes the following steps.

Step 501: When receiving a data backup request instruction, the main controller 430 sends a first signal switching instruction to the first MUX 450, and sends a second signal switching instruction to the second MUX 460.

In an implementation, when the I/O controller 420 of the user terminal 400 is faulty, a skilled person sends the data backup request instruction to the main controller 430 after connecting the backup device 500 to the first interface 470 of the user terminal 400. After receiving the data backup request instruction, the main controller 430 sends the first signal switching instruction to the first MUX 450, and send the second signal switching instruction to the second MUX 460.

Optionally, the user terminal 400 further includes the authentication information input component 480 connected to the main controller 430. When receiving the data backup instruction, the main controller 430 sends an authentication request instruction to the authentication information input component 480. When receiving the authentication request instruction, the authentication information input component 480 collects authentication information of a user, and sends an authentication response instruction to the main controller 430, where the authentication response instruction carries the authentication information. When receiving the authentication response instruction, the main controller 430 performs authentication on the user based on the authentication information and prestored user information, and if the authentication succeeds, sends the first signal switching instruction to the first MUX 450, and sends the second signal switching instruction to the second MUX 460.

In an implementation, the main controller 430 prestores the user information, where the user information is fingerprint information, a password, or the like. When the main controller 430 receives the data backup instruction, the main controller 430 sends the authentication request instruction to the authentication information input component 480, to ensure security of the data in the storage component 410. Then, after receiving the authentication request instruction, the authentication information input component 480 collects the authentication information of the user, and send the authentication response instruction to the main controller 430, where the authentication response instruction carries the authentication information. Subsequently, after receiving the authentication response instruction, the main controller 430 parses the authentication response instruction, to learn that the authentication response instruction carries the authentication information. After obtaining the authentication information, the main controller 430 queries whether the authentication information exists in the prestored user information. If the authentication information exists in the prestored user information, the authentication information indicates that the authentication succeeds. In this case, the main controller 430 further sends the first signal switching instruction to the first MUX 450, and send the second signal switching instruction to the second MUX 460.

User terminal 400 further includes a display connected to the main controller 430. When the main controller 430 receives the data backup instruction, the main controller 430 further prompts, through the display, the user to enter the authentication information.

Step 502: The first MUX 450 receives the first signal switching instruction, and connects the second signal input end 453 to the first signal output end 454 according to the first signal switching instruction.

In an implementation, after receiving the first signal switching instruction, the first MUX 450 connects the second signal input end 453 to the first signal output end 454.

Step 503: The second MUX 460 receives the second signal switching instruction, and connects the fourth signal input end 463 to the second signal output end 464 according to the second signal switching instruction.

In an implementation, after receiving the second signal switching instruction, the second MUX 460 connects the fourth signal input end 463 to the second signal output end 464.

Step 504: When the second signal input end 453 of the first MUX 450 is connected to the first signal output end 454 of the first MUX 450, and the fourth signal input end 463 of the second MUX 460 is connected to the second signal output end 464 of the second MUX 460, the interface controller 440 sends an I/O instruction to the storage component 410 to perform data backup processing.

In an implementation, after the second signal input end 453 of the first MUX 450 is connected to the first signal output end 454 of the first MUX 450, and the fourth signal input end 463 of the second MUX 460 is connected to the second signal output end 464 of the second MUX 460, the skilled person directly sends the I/O instruction to the storage component 410 by using the interface controller 440 of the user terminal 400, to back up data in the storage component 410 to the backup device 500.

Optionally, when the storage component 410 is a storage component of a PCIe type, the user terminal 400 further includes the clock selector 490. The main controller 430 further needs to ensure clock synchronization between the storage component 410 and the interface controller 440. A specific processing process is as follows:

Step 1: The main controller 430 sends a third signal switching instruction to the clock selector 490 when receiving the data backup instruction.

In an implementation, when the I/O controller 420 of the user terminal 400 is faulty, a skilled person sends the data backup request instruction to the main controller 430 after connecting the backup device 500 to the first interface 470 of the user terminal 400. The main controller 430 sends the third signal switching instruction to the clock selector 490 after receiving the data backup request instruction.

Step 2: The clock selector 490 receives the third signal switching instruction, and connects the sixth signal input end 493 to the third signal output end 494 according to the third signal switching instruction.

In an implementation, after receiving the third signal switching instruction, the clock selector 490 connects the sixth signal input end 493 to the third signal output end 494.

Step 3: The storage component 410 receives a clock signal sent by the interface controller 440, to implement clock synchronization between the storage component 410 and the interface controller 440.

In an implementation, the interface controller 440 directly sends the clock signal to the storage component 410, to ensure clock synchronization between the storage component 410 and the interface controller 440.

All or some of the foregoing embodiments is implemented by using software, hardware, firmware, or any combination thereof. When the software is used for implementation, all or some of the embodiments is implemented in a form of a computer program product. The computer program product includes one or more computer instructions. When the computer program instructions are loaded and executed on a computer, all or some of the procedures or functions according to the embodiments of this application are generated. The computer is a general-purpose computer, a dedicated computer, a computer network, or another programmable apparatus. The computer instructions is stored in a computer readable storage medium or is transmitted from a computer readable storage medium to another computer readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD)), or the like.

What is claimed is:

1. A user terminal, wherein the user terminal comprises:
    a storage component,
    an input/output (I/O) controller,
    a main controller,
    a first configuration channel (CC) controller,
    a first multiplexer (MUX),
    a second MUX,
    a third MUX, and
    a first interface,
    wherein:
        the first CC controller being connected to each of the first interface and a first signal selection input end of the first MUX, and being configured to send a first signal switching instruction to the first MUX in response to a debugging device being connected to the first interface of the user terminal being detected;
        a first signal input end of the first MUX being connected to the I/O controller, a second signal input end of the first MUX being connected to the main controller, and a first signal output end of the first MUX being connected to the first interface;
        the first MUX being configured to connect the second signal input end to the first signal output end in response to the first signal switching instruction being received, so that the main controller receives, through the first interface, a data backup instruction sent by the debugging device;
        the main controller being connected to each of a second signal selection input end of the second MUX and a third signal selection input end of the third MUX, and being configured to send a second signal switching instruction to the second MUX in response to the data backup instruction being received, and send a third signal switching instruction to the third MUX;
        a third signal input end of the second MUX being connected to the I/O controller, a fourth signal input end of the second MUX being connected to a sixth signal input end of the third MUX, and a second signal output end of the second MUX being connected to the storage component;
        the second MUX being configured to connect the fourth signal input end to the second signal output end in response to the second signal switching instruction being received;
        a fifth signal input end of the third MUX being connected to the I/O controller, and a third signal output end of the third MUX being connected to the first interface;
        the third MUX being configured to connect the sixth signal input end to the third signal output end in response to the third signal switching instruction being received; and
        the storage component being configured to receive an I/O instruction sent by the debugging device in response to the fourth signal input end of the second MUX being connected to the second signal output end of the second MUX and the sixth signal input end of the third MUX being connected to the third signal output end of the third MUX, and the storage component being configured to perform data backup processing according to the I/O instruction.

2. The user terminal according to claim 1, wherein when the storage component being a bus and interface PCIe type, the user terminal further comprises:
    a clock selector and a fourth MUX, wherein:
        the main controller being connected to each of a fourth signal selection input end of the clock selector and a fifth signal selection input end of the fourth MUX, and being configured to send a fourth signal switching instruction to the clock selector in response to the data backup instruction being received, and send a fifth signal switching instruction to the fourth MUX;
        a seventh signal input end of the clock selector being connected to the I/O controller, an eighth signal input end of the clock selector being connected to a tenth signal input end of the fourth MUX, and a fourth signal output end of the clock selector being connected to the storage component;
        the clock selector being configured to connect the eighth signal input end to the fourth signal output end in response to the fourth signal switching instruction being received;
        a ninth signal input end of the fourth MUX being connected to the I/O controller, and a fifth signal output end of the fourth MUX being connected to the first interface;
        the fourth MUX being configured to connect the tenth signal input end to the fifth signal output end in response to the fifth signal switching instruction being received; and the storage component being further configured to receive a clock signal sent by the debugging device in response to the eighth signal input end of the clock selector being connected to the fourth signal output end of the clock selector and the tenth signal input end of the fourth MUX being connected to the fifth signal output end of the fourth MUX, and the storage component being further configured to implement clock synchronization between the storage component and the debugging device.

3. The user terminal according to claim 1, wherein the user terminal further comprises:
an authentication information input component connected to the main controller, wherein:
the main controller being further configured to send an authentication request instruction to the authentication information input component in response to the data backup instruction being received;
the authentication information input component being configured to collect authentication information of a user in response to the authentication request instruction being received, and the authentication information input component being configured to send an authentication response instruction to the main controller, wherein the authentication response instruction carries the authentication information; and
the main controller being further configured to perform authentication on the user based on the authentication information and prestored user information in response to the authentication response instruction being received, and the main controller being further configured to send the second signal switching instruction to the second MUX in response to a successful authentication, and the main controller being further configured to send the third signal switching instruction to the third MUX.

4. A debugging device, wherein the debugging device comprises:
an interface controller,
a connection component, and
a second interface, wherein:
the connection component being connected to the second interface, and being configured to enable a user terminal to detect that the debugging device being connected to the user terminal after the second interface being connected to a first interface of the user terminal;
the interface controller being connected to the second interface, and being configured to send a data backup instruction to a main controller of the user terminal in response to a data backup request instruction of a user being detected; and
the interface controller being further configured to send an input/output I/O instruction to a storage component of the user terminal to perform data backup processing.

5. The debugging device according to claim 4, wherein the connection component comprises:
a second configuration channel (CC) controller, wherein:
the second CC controller being connected to the second interface, and being configured to send a connection instruction to a first CC controller of the user terminal through the second interface after the second interface being connected to the first interface of the user terminal, so that the first CC controller determines that the debugging device being connected to the user terminal after the connection instruction being received.

6. The debugging device according to claim 4, wherein the connection component comprises:
a resistor module, wherein:
the resistor module being connected to the second interface, and being configured to enable a first CC controller of the user terminal to switch from a high potential to a low potential after the debugging device being connected to the first interface of the user terminal through the second interface, to determine that the debugging device is connected to the user terminal.

7. A user terminal, wherein the user terminal comprises:
a storage component,
an input/output (I/O) controller,
a main controller,
an interface controller,
a first multiplexer (MUX),
a second MUX, and
a first interface, wherein:
the main controller being connected to each of a first signal selection input end of the first MUX and a second signal selection input end of the second MUX, and being configured to:
send a first signal switching instruction to the first MUX in response to a data backup request instruction of a user being received, and
send a second signal switching instruction to the second MUX;
a first signal input end of the first MUX being connected to the I/O controller;
a second signal input end of the first MUX being connected to the interface controller;
a first signal output end of the first MUX being connected to the storage component;
the first MUX being configured to connect the second signal input end to the first signal output end in response to the first signal switching instruction being received;
a third signal input end of the second MUX being connected to the I/O controller;
a fourth signal input end of the second MUX being connected to the interface controller;
a second signal output end of the second MUX being connected to the first interface;
the second MUX being configured to connect the fourth signal input end to the second signal output end in response to the second signal switching instruction being received; and
the interface controller being configured to:
send an I/O instruction to the storage component to perform data backup processing in response to the second signal input end of the first MUX being connected to the first signal output end of the first MUX and the fourth signal input end of the second MUX being connected to the second signal output end of the second MUX.

8. The user terminal according to claim 7, wherein in response to the storage component being a bus and interface PCIe type, the user terminal further comprises:
a clock selector, wherein:
the main controller being connected to a third signal selection input end of the clock selector, and being configured to send a third signal switching instruction to the clock selector in response to a data backup instruction being received;
a fifth signal input end of the clock selector being connected to the I/O controllers;
a sixth signal input end of the clock selector being connected to the interface controller;
a third signal output end of the clock selector being connected to the storage component;
the clock selector being configured to connect the sixth signal input end to the third signal output end in response to the third signal switching instruction being received; and
the storage component being further configured to:
receive a clock signal sent by the interface controller in response to the sixth signal input end of the clock selector being connected to the third signal output end of the clock selector, to implement clock synchronization between the storage component and the interface controller.

9. The user terminal according to claim 7, wherein the user terminal further comprises:
an authentication information input component connected to the main controller, wherein:
the main controller being further configured to send an authentication request instruction to the authentication information input component in response to a data backup instruction being received;
the authentication information input component being configured to:
collect user authentication information in response to the authentication request instruction being received, and
send an authentication response instruction to the main controller;
wherein the authentication response instruction carries the authentication information; and
the main controller being further configured to:
perform authentication on the user based on the authentication information and prestored user information in response to the authentication response instruction being received,
send the first signal switching instruction to the first MUX in response to a successful authentication, and
send the second signal switching instruction to the second MUX.

10. A data backup method, wherein the method being applied to a user terminal, and the method comprises:
sending, by a first configuration channel (CC) controller, a first signal switching instruction to a first multiplexer (MUX) in response to detecting that a debugging device is connected to a first interface of the user terminal;
receiving, by the first MUX, the first signal switching instruction;
connecting a second signal input end to a first signal output end according to the first signal switching instruction, so that a main controller receives, through the first interface, a data backup instruction sent by the debugging device;
sending, by the main controller, a second signal switching instruction to a second MUX and sending a third signal switching instruction to a third MUX in response to receiving the data backup instruction;
receiving, by the second MUX, the second signal switching instruction, and connecting a fourth signal input end to a second signal output end according to the second signal switching instruction;
receiving, by the third MUX, the third signal switching instruction;
connecting a sixth signal input end to a third signal output end according to the third signal switching instruction;
receiving, by a storage component, an input/output (I/O) instruction sent by the debugging device; and
performing data backup processing according to the I/O instruction.

11. The method according to claim 10, wherein in response to the storage component being a bus and interface PCIe type, the user terminal further comprises a clock selector and a fourth MUX; and the method further comprises:
sending, by the main controller, a fourth signal switching instruction to the clock selector, and sending a fifth signal switching instruction to the fourth MUX in response to receiving the data backup instruction;
receiving, by the clock selector, the fourth signal switching instruction, and connecting an eighth signal input end to a fourth signal output end according to the fourth signal switching instruction;
receiving, by the fourth MUX, the fifth signal switching instruction;
connecting a tenth signal input end to a fifth signal output end according to the fifth signal switching instruction; and
receiving, by the storage component, a clock signal sent by the debugging device, to implement clock synchronization between the storage component and the debugging device.

12. The method according to claim 10, wherein the user terminal further comprises an authentication information input component connected to the main controller; and the method further comprises:
sending, by the main controller, an authentication request instruction to the authentication information input component in response to receiving the data backup instruction;
collecting, by the authentication information input component, authentication information of a user, and sending an authentication response instruction to the main controller in response to receiving the authentication request instruction, wherein the authentication response instruction carries the authentication information; and
performing, by the main controller, authentication on the user based on the authentication information and prestored user information in response to receiving the authentication response instruction, and in response to the authentication succeeding, sending the second signal switching instruction to the second MUX, and sending the third signal switching instruction to the third MUX.

13. A data backup method, wherein the method being applied to a user terminal, and the method comprises:
sending, by a main controller in response to detecting a data backup request instruction of a user, a first signal switching instruction to a first multiplexer (MUX) and sending a second signal switching instruction to a second MUX;
receiving, by the first MUX, the first signal switching instruction, and connecting a second signal input end to a first signal output end according to the first signal switching instruction;
receiving, by the second MUX, the second signal switching instruction, and connecting a fourth signal input end to a second signal output end according to the second signal switching instruction; and sending, by an interface controller, an input/output I/O instruction to a storage component to perform data backup processing in response to the second signal input end of the first MUX being connected to the first signal output end of the first MUX and the fourth signal input end of the second MUX being connected to the second signal output end of the second MUX.

14. The method according to claim 13, wherein in response to the storage component being a bus and interface PCIe type, the user terminal further comprises a clock selector; and the method further comprises:

sending, by the main controller, a third signal switching instruction to the clock selector in response to receiving a data backup instruction;

receiving, by the clock selector, the third signal switching instruction, and connecting a sixth signal input end to a third signal output end according to the third signal switching instruction; and receiving, by the storage component, a clock signal sent by the interface controller, to implement clock synchronization between the storage component and the interface controller.

15. The method according to claim 13, wherein the user terminal further comprises an authentication information input component connected to the main controller; and the method further comprises:

sending, by the main controller, an authentication request instruction to the authentication information input component in response to receiving a data backup instruction;

collecting, by the authentication information input component, user authentication information, and sending an authentication response instruction to the main controller in response to receiving the authentication request instruction, wherein the authentication response instruction carries the authentication information; and performing, by the main controller, authentication on the user based on the authentication information and prestored user information in response to receiving the authentication response instruction, and in response to the authentication succeeding, sending the first signal switching instruction to the first MUX, and sending the second signal switching instruction to the second MUX.

* * * * *